(12) United States Patent
Aso et al.

(10) Patent No.: US 10,326,339 B2
(45) Date of Patent: Jun. 18, 2019

(54) ROTOR OF ELECTRIC MOTOR, ELECTRIC MOTOR, AND AIR CONDITIONER

(71) Applicant: Mitsubishi Electric Corporation, Tokyo (JP)

(72) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 267 days.

(21) Appl. No.: 15/303,130

(22) PCT Filed: Jul. 8, 2014

(86) PCT No.: PCT/JP2014/068170
§ 371 (c)(1),
(2) Date: Oct. 10, 2016

(87) PCT Pub. No.: WO2016/006035
PCT Pub. Date: Jan. 14, 2016

(65) Prior Publication Data
US 2017/0033647 A1     Feb. 2, 2017

(51) Int. Cl.
*H02K 15/03*     (2006.01)
*H02K 1/30*     (2006.01)
(Continued)

(52) U.S. Cl.
CPC ............. *H02K 11/215* (2016.01); *H02K 1/02* (2013.01); *H02K 1/2733* (2013.01); *H02K 1/30* (2013.01); *H02K 15/03* (2013.01); *H02K 29/08* (2013.01)

(58) Field of Classification Search
CPC ......... H02K 1/2733; H02K 1/30; H02K 15/03
(Continued)

(56) References Cited

U.S. PATENT DOCUMENTS

2013/0293036 A1     11/2013     Yamamoto et al.

FOREIGN PATENT DOCUMENTS

| JP | 2006-121807 A | 5/2006 |
| JP | 2011-030314 A | 2/2011 |

(Continued)

OTHER PUBLICATIONS

International Search Report of the International Searching Authority dated Sep. 22, 2014 for the corresponding international application No. PCT/JP2014/068170 (and English translation).

(Continued)

*Primary Examiner* — Jeremy A Luks
(74) *Attorney, Agent, or Firm* — Posz Law Group, PLC

(57) ABSTRACT

A rotor of an electric motor configured by combining a resin magnet section molded of thermoplastic resin containing ferrite and a rotation shaft includes a magnetic section for position detection integrally formed of the thermoplastic resin on an end face on one side of the resin magnet section, the thermoplastic resin being injected from an inner diameter side of the resin magnet section to the end face. Because the position of the rotor can be detected by the magnetic section without using a magnet for position detection, cost reduction can be achieved while the accuracy of detecting the position of the rotor is ensured.

9 Claims, 5 Drawing Sheets

(51) Int. Cl.
    *H02K 1/27*     (2006.01)
    *H02K 11/215*     (2016.01)
    *H02K 1/02*     (2006.01)
    *H02K 29/08*     (2006.01)

(58) Field of Classification Search
    USPC .......................................................... 310/43
    See application file for complete search history.

(56) References Cited

FOREIGN PATENT DOCUMENTS

| | | | |
|---|---|---|---|
| JP | 2011-061937 A | 3/2011 | |
| JP | 2011-120334 A | 6/2011 | |
| JP | 2011-120335 A | 6/2011 | |
| JP | 2012-095375 A | 5/2012 | |
| WO | WO-2012098820 A1 * | 7/2012 | ............. H02K 1/276 |

OTHER PUBLICATIONS

Extended EP Search Report dated Feb. 27, 2018 issued in corresponding EP patent application No. 14897192.2.
Office Action dated Apr. 11, 2017 issued in corresponding JP patent application No. 2016-532816 (and English translation).
Office Action dated May 3, 2018 issued in corresponding CN patent application No. 201480079393.8 (and English translation).
Office action dated Nov. 14, 2018 issued in corresponding CN patent application No. 201480079393.8 (and English machine translation thereof).
Office action dated Mar. 13, 2019 issued in corresponding CN patent application No. 201480079393.8 (and English translation thereof).

* cited by examiner

ROTOR OF ELECTRIC MOTOR, ELECTRIC MOTOR, AND AIR CONDITIONER

CROSS REFERENCE TO RELATED APPLICATION

This application is a U.S. national stage application of International Patent Application No. PCT/JP2014/068170 filed on Jul. 8, 2014, the disclosure of which is incorporated herein by reference.

TECHNICAL FIELD

The present invention relates to a rotor of an electric motor, a molded electric motor, and an air conditioner.

BACKGROUND

A conventional rotor of an electric motor described in Patent Literature 1 includes a yoke molded of thermoplastic resin containing soft magnetic material or ferrite, and a resin magnet section integrally formed of a resin magnet in an outer circumference of the yoke. This resin magnet section is molded of a resin magnet supplied from a donut-like runner located inside the yoke and rib-like runners radially extending from the donut-like runner to the outer circumference of the yoke outward in a radial direction. A pedestal on which a magnet for position detection is to be placed is formed on an axial direction end face of the resin magnet section by the resin magnet injected though the rib-like runners.

PATENT LITERATURE

Patent Literature 1: Japanese Patent Application Laid-open No. 2011-120334

However, in a case where a rotor is formed of a resin magnet only without using a magnet for position detection, a method for improving the accuracy of detecting the position of a rotor is not disclosed in conventional techniques represented by the above Patent Literature 1, and there is a problem of increase in the cost when the magnet for position detection is provided in the rotor in order to ensure the accuracy of position detection.

SUMMARY

The present invention has been achieved in view of the above problems, and an object of the present invention is to provide a rotor of an electric motor, a molded electric motor, and an air conditioner that can achieve cost reduction while ensuring the accuracy of detecting the position of the rotor.

In order to solve the above mentioned problems and achieve the object, according to an aspect of the present invention, there is provided a rotor of an electric motor configured by combining an annular magnet section molded of thermoplastic resin containing ferrite and a rotating shaft penetrating through the annular magnet section in an axial direction of the annular magnet section, the rotor comprising a magnetic section for position detection formed of a resin magnet injected to an axial direction end face of the annular magnet section and integrally formed of the resin magnet on the axial direction end face.

According to the present invention, cost reduction can be achieved while ensuring the accuracy of detecting the position of a rotor by providing a magnetic section for position detection in a resin magnet section.

DETAILED DESCRIPTION

Exemplary embodiments of a rotor of an electric motor, a molded electric motor, and an air conditioner according to the present invention will be explained below in detail with reference to the accompanying drawings. The present invention is not limited to the embodiments.

Embodiment

Figure 1:
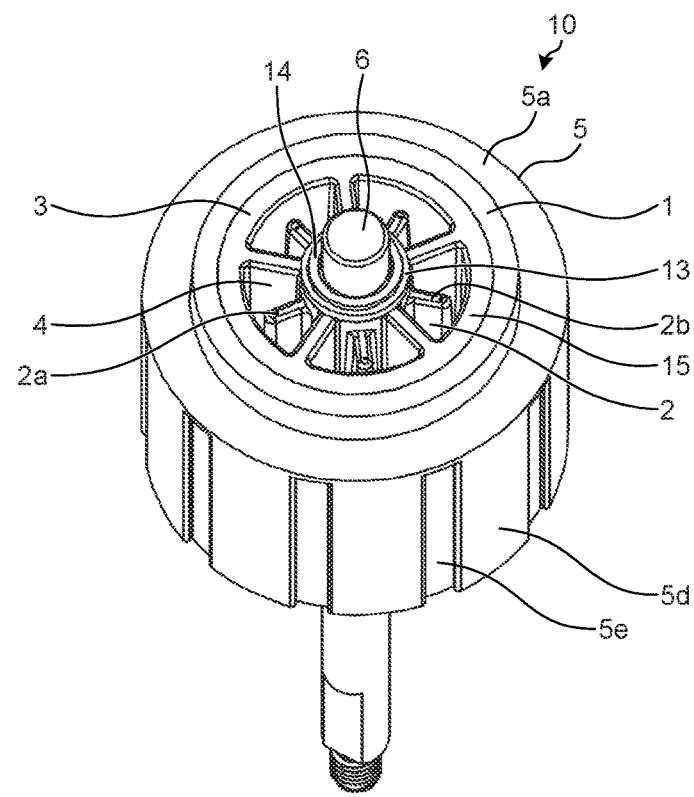
FIG. 1 is a perspective view of a rotor of an electric motor according to an embodiment of the present invention, as viewed from one end side thereof.
Figure 2:
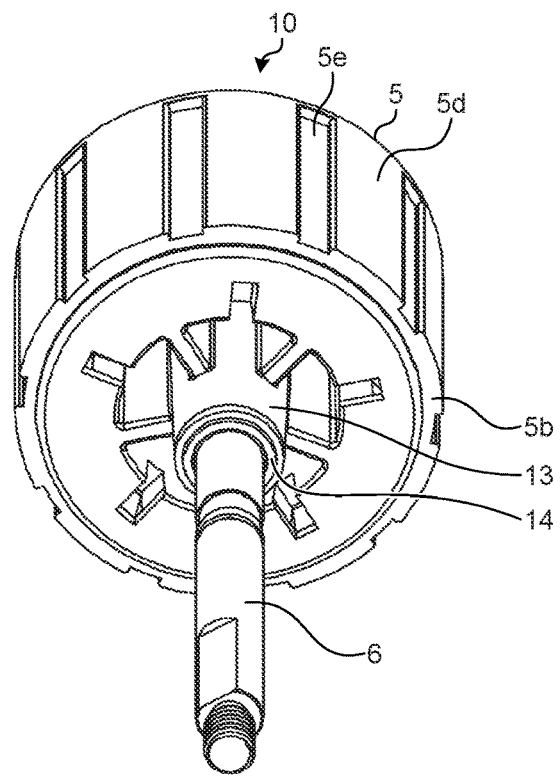
FIG. 2 is a perspective view of the rotor of the electric motor according to the embodiment of the present invention, as viewed from the other end side thereof.
Figure 3:
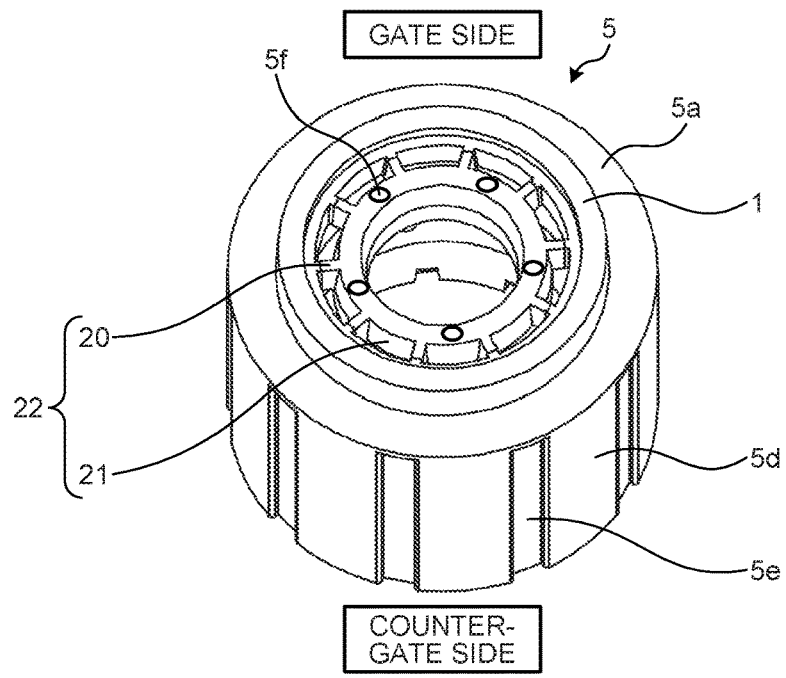
FIG. 3 is a perspective view of a resin magnet section in FIG. 1, as viewed from one end side thereof.
Figure 4:
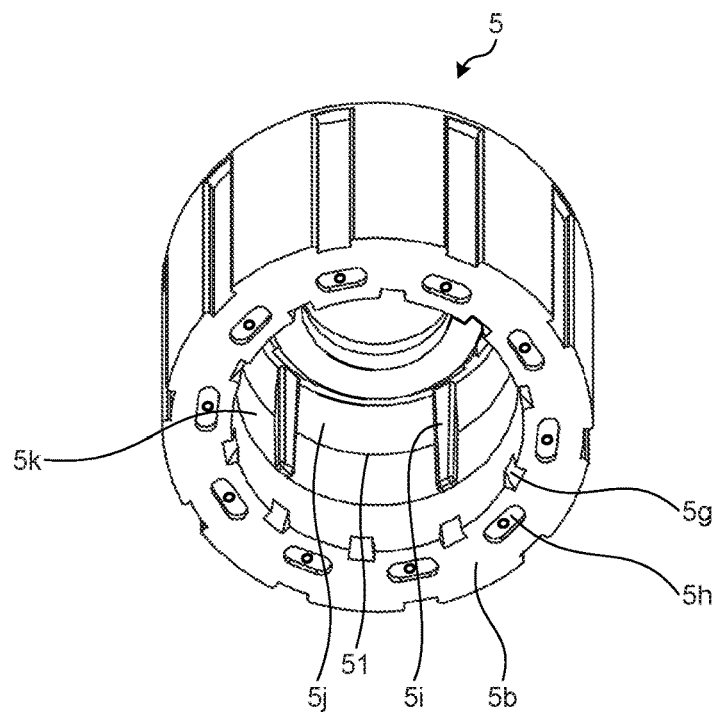
FIG. 4 is a perspective view of the resin magnet section in FIG. 1, as viewed from the other end side thereof.
Figure 5:
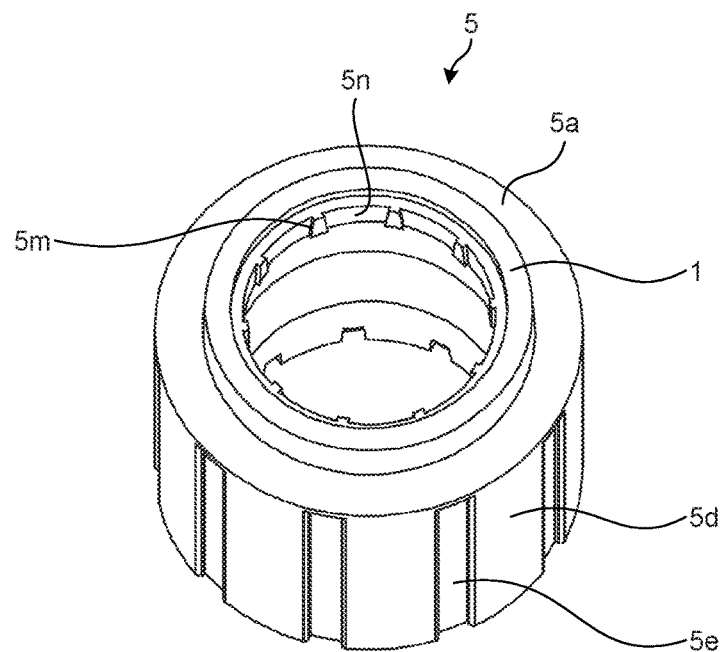
FIG. 5 is a perspective view of the resin magnet section after a runner in FIG. 3 is removed, as viewed from the one end side thereof.
Figure 6:
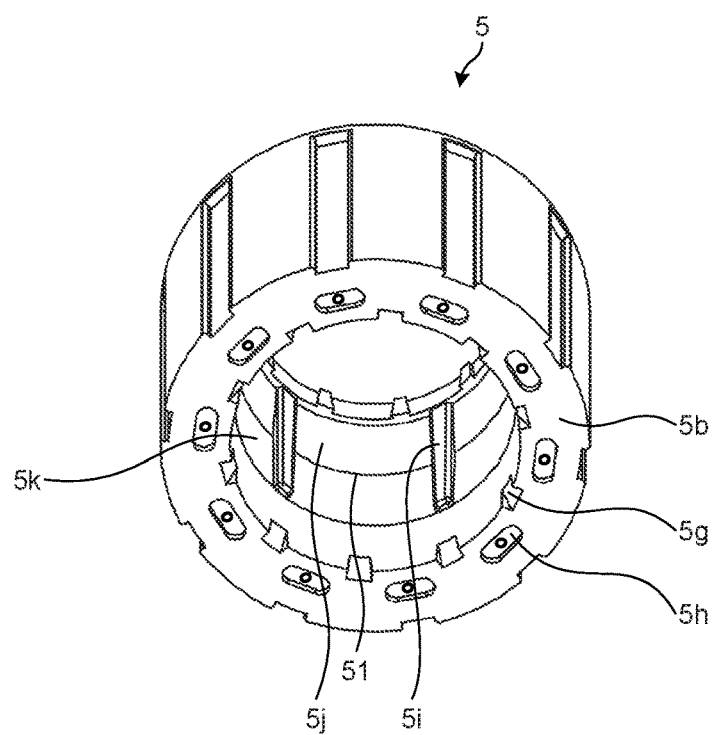
FIG. 6 is a perspective view of the resin magnet section after the runner in FIG. 3 is removed, as viewed from the other end side thereof.
Figure 7:
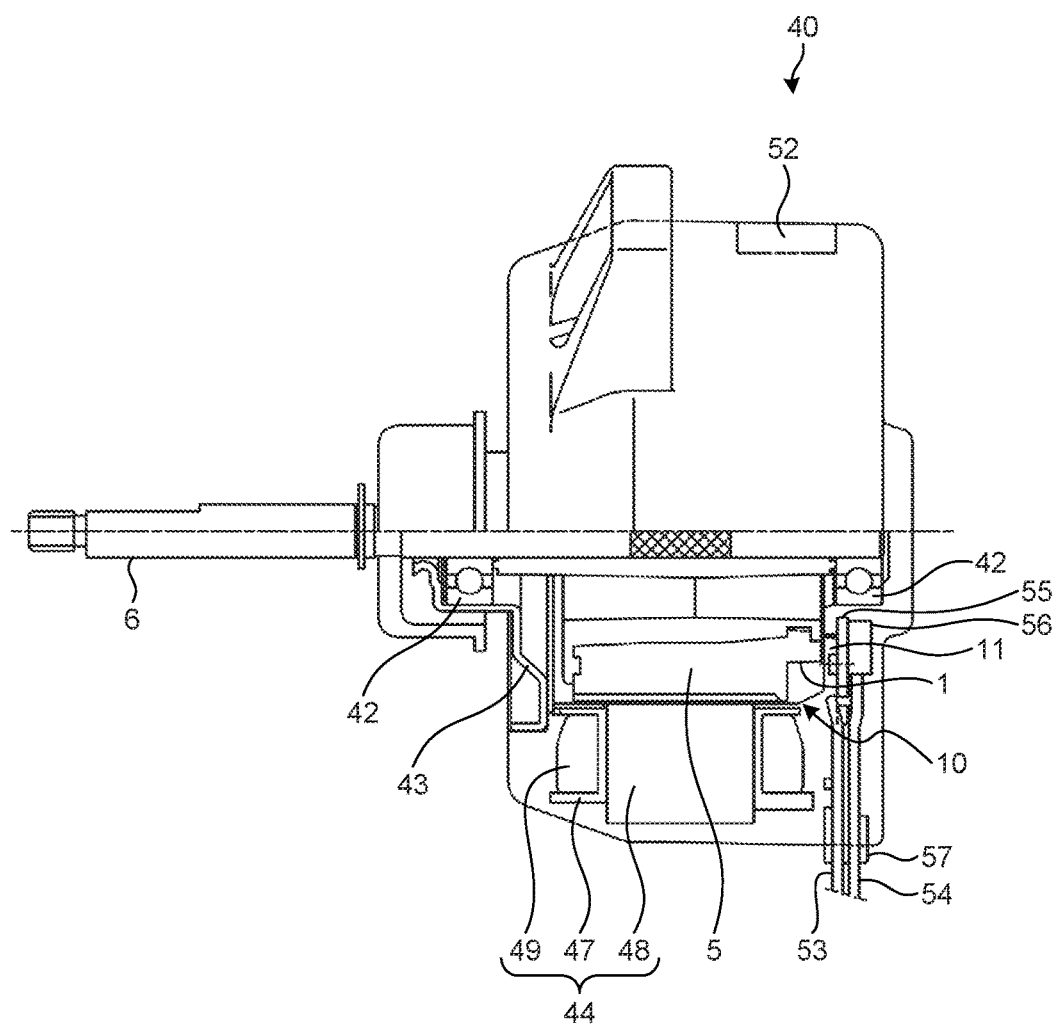
FIG. 7 is a side view of a molded electric motor according to the embodiment of the present invention.

FIG. 1 is a perspective view of a rotor of an electric motor according to an embodiment of the present invention, as viewed from one end side thereof. FIG. 2 is a perspective view of the rotor of the electric motor according to the embodiment of the present invention, as viewed from the other end side thereof. FIG. 3 is a perspective view of a resin magnet section in FIG. 1, as viewed from one end side thereof. FIG. 4 is a perspective view of the resin magnet section in FIG. 1, as viewed from the other end side thereof. FIG. 5 is a perspective view of the resin magnet section after a runner in FIG. 3 is removed, as viewed from the one end side thereof. FIG. 6 is a perspective view of the resin magnet section after the runner in FIG. 3 is removed, as viewed from the other end side thereof. FIG. 7 is a side view of a molded electric motor according to the embodiment of the present invention.

A rotor 10 illustrated in FIG. 1 is molded by setting a rotation shaft 6 and a resin magnet section 5 into a resin molding mold and injecting thermoplastic resin 3, such as PBT (polybutylene terephthalate), into the resin molding mold. A cylindrical resin section 13 that is cylindrical is formed of the thermoplastic resin 3 in an outer circumference of the rotation shaft 6. Stopping sections 14 that stop bearings 42 butted against thereto are formed at both axial direction end portions of the cylindrical resin section 13. The bearings 42 that are ball bearings, for example, are assembled to the rotation shaft 6 on both end sides of the rotor 10 respectively. While the bearings 42 are in contact with the stopping sections 14, respectively, the rotor 10 is combined with a stator 44 (see FIG. 7). A molded electric motor 40 illustrated in FIG. 7 is a brushless DC motor (a synchronous electric motor), for example.

As illustrated in FIG. 7, a twill pattern is formed on a portion of the rotation shaft 6, which comes in contact with the cylindrical resin section 13 (see FIG. 1). The twill pattern is generally referred to as knurling 8, and is formed by grooves in the form of crossed lines formed mainly on an outer circumference of a round structure (the rotation shaft 6 here). The twill pattern increases the coefficient of friction between the rotation shaft 6 and the cylindrical resin section 13 or is made to closely fit to an inner diameter portion of the cylindrical resin section 13, so that the twill pattern functions as a stopper that prevents the cylindrical resin section 13 from falling off or rotating.

While the rotor 10 having ten magnetic poles is described as an example in the present embodiment, the number of the magnetic poles is not limited to ten, but may be an arbitrary number.

Details of a structure of the resin magnet section 5 illustrated in FIGS. 3 to 5 are described later. First, molding of the thermoplastic resin 3 such as PBT (polybutylene terephthalate) is described here. The resin magnet section 5 in FIG. 5 is inserted into a lower portion (a core portion) of a mold provided in a vertical molding machine (not illustrated) from the side of an end face 5b (the side of an end face in which concave portions 5h are formed) of the resin magnet section 5. By this insertion, the resin magnet section 5 is incorporated in the lower portion of the mold.

The lower portion of the mold has convex portions that are coaxial with a mold-insertion portion of the rotation shaft 6. These convex portions are fitted into tapered notches 5g (see FIG. 6) provided in the end face 5b of the resin magnet section 5. When the mold is fastened, these convex portions are pressed against the notches 5g, so that an outer circumference of the resin magnet section 5 and the rotation shaft 6 are made coaxial.

The plurality of notches 5g in FIG. 6 are provided to correspond to the magnetic poles. In the illustrated example, ten notches 5g are formed to be spaced approximately evenly in the circumferential direction. The reason why the notches 5g are provided to correspond to the magnetic poles is to make magnetic paths for the respective magnetic poles of the resin magnet section 5 substantially the same. The shape of each notch 5g is formed to have a predetermined width in the circumferential direction and to be inclined from the end face 5b to a hollow portion of the resin magnet section 5.

The respective notches 5g are formed to be spaced approximately evenly in the circumferential direction in such a manner that the outer circumference of the resin magnet section 5 and a yoke (not illustrated) are made coaxial with each other when the resin magnet section 5 is molded of the thermoplastic resin 3 integrally with the rotation shaft 6. By holding the notches 5g with the mold to maintain coaxiality, it is possible to ensure coaxiality and phase, thereby improving the quality in manufacturing.

The number of the convex portions of the lower portion of the mold, fitted into the notches 5g, is five in the present embodiment. Therefore, the convex portions of the lower portion of the mold are fitted into five of the ten notches 5g, which are spaced approximately evenly in the circumferential direction. When the resin magnet section 5 is inserted and incorporated in the lower portion of the mold from the side of the end face 5b, it suffices that any five of the ten notches 5g are fitted to the five convex portions of the lower portion. Therefore, operability is improved as compared with a case where five notches 5g are formed in the resin magnet section 5.

When the thermoplastic resin 3 is filled, the rotation shaft 6 with the knurling 8 formed thereon is set at the center of the resin magnet section 5 incorporated in the lower portion of the mold. Although the details are omitted, the lower portion of the mold arranged on a turn table turns by 180°, for example, at a predetermined rotation speed when molding is performed. Subsequently, gate convex portions 2 (see FIG. 1) are formed radially from the outer circumference of the cylindrical resin section 13 outward in the radial direction. The gate convex portions 2, the number of which is a half of the number of the magnetic poles (for example, five), are formed in the present embodiment. The thermoplastic resin 3 for resin molding is injected from the side of an end face 5a of the resin magnet section 5. Therefore, a gate processing mark 2a remains on one end face 2b of the gate convex portion 2.

The gate convex portions 2 extend from the cylindrical resin section 13 outward in the radial direction by a predetermined length. Further, an inner circumferential surface of an inner-circumference-side resin section 15 of the resin magnet section 5 and radial direction ends of the gate convex portions 2 are away from each other by a predetermined distance.

The radial direction ends of the gate convex portions 2 are located between the magnetic poles of the resin magnet section 5. The one end faces 2b of the gate convex portions 2 are located closer to an axial direction center side of the resin magnet section 5 than the end face 5a of the resin magnet section 5 by a predetermined distance (for example, about 1 mm).

The other end faces (not illustrated) of the gate convex portions 2 are located in a mold-matching face mark (see FIG. 4) between an upper portion and the lower portion of the resin molding mold. An axial direction length of the gate convex portions 2 is approximately a half of an axial direction length of the resin magnet section 5, for example.

The reason why the one end faces 2b of the gate convex portions 2 are located inside the resin magnet section 5 by the predetermined distance from the end face 5a of the resin magnet section 5 is described. As already described, the thermoplastic resin 3 is injected from the side of the end face 5a of the resin magnet section 5, and the gate processing mark 2a remains in the end face 2b of the gate convex portion 2. This gate processing mark 2a may protrude axially outward from the end face 2b of the gate convex portion 2. Therefore, when the rotor 10 is incorporated in the stator 44, the bearing 42, for example, may interfere with the protrusion of the gate processing mark 2a. It is necessary to remove all the protrusions of the gate processing marks 2a in order to avoid such interference. However, by arranging the one end face 2b of the gate convex portion 2 inside the resin magnet section 5, it is possible to prevent the interference with the bearing 42 only by partly removing the gate processing marks 2a. Therefore, the productivity can be improved.

A plurality of ribs 4 radially extending from the cylindrical resin section 13 to the inner-circumference-side resin section 15 are formed between the cylindrical resin section 13 and the inner-circumference-side resin section 15. In FIG. 1, five ribs 4 are formed to be spaced approximately evenly in the circumferential direction. The thermoplastic resin 3 reaches the resin magnet section 5 via the ribs 4, so that the cylindrical resin section 13 and the resin magnet section 5 are integrated to form a rotor magnet.

Because the thermoplastic resin 3 injected from the gate convex portions 2 is directly injected from the gate convex portions 2 to the cylindrical resin section 13, it is possible to fill the thermoplastic resin 3 in the cylindrical resin section 13 most quickly. Therefore, the weld strength of the cylindrical resin section 13 can be improved. To the contrary, according to a conventional technique, the thermoplastic resin 3 is injected to the inner-circumference-side resin section 15, and the thermoplastic resin 3 injected to the inner-circumference-side resin section 15 is filled in the cylindrical resin section 13 via the ribs 4.

The number, a circumferential direction thickness, an axial direction length, and a radial direction length of the ribs 4 radially extending from the cylindrical resin section 13 may be as small, thin, and short as possible within ranges providing strength that can withstand a generated torque of an electric motor and a repeated stress caused by an intermittent operation.

Further, a transmission exciting force from the resin magnet section 5 to the rotation shaft 6 can be adjusted by changing the number, the circumferential direction thickness, the axial direction length, and the radial direction length of the ribs 4 to adjust rigidity in the circumferential direction. This adjustment can reduce noise of the electric motor, thereby improving the product quality. When the rotor 10 is molded by using the thermoplastic resin 3, it is possible to prevent generation of burrs on the outer circumference side of the resin magnet section 5 by filling the thermoplastic rein 3 while pressing both the axial direction end faces of the resin magnet section 5 near the outer circumference thereof by the mold. Because no work for removing the burrs is required, the productivity and the quality can be improved.

Also, the thermoplastic resin 3 is filled to be embedded into a part of the plural notches 5g of the resin magnet section 5 (here, the five notches 5g into which no convex portion of the lower portion of the mold is fitted) and the ten concave portions 5h formed in the end face 5b of the resin magnet section 5. The embedded thermoplastic resin 3 has a function of transmitting torque and a function of a rotation stopper in a rotating direction.

By completely embedding the concave portions 5h of the resin magnet section 5 with the thermoplastic resin 3, it is possible to prevent generation of a gap between the thermoplastic resin 3 and the resin magnet section 5, thereby preventing reduction of a bonding force.

Next, the structure of the resin magnet section 5 illustrated in FIGS. 3 to 5 is described in detail. The resin magnet section 5 is obtained by injection molding of the thermoplastic resin 3 containing ferrite. When the resin magnet section 5 is molded, a strong magnet is arranged outside a mold for forming the outer circumference of the resin magnet section 5, and the ferrite contained in the resin magnet section 5 is anisotropically aligned with respect to a polar direction by an aligning magnetic field of this magnet. That is, the resin magnet section 5 is anisotropically aligned with respect to the polar direction by the aligning magnetic field outside a portion of the mold, the portion forming the outer circumference of the resin magnet (a part of the mold).

The resin magnet section 5 is formed to be substantially cylindrical, as illustrated in FIG. 3. In the outer circumference of the resin magnet section 5, concave portions 5e and convex portions 5d are alternately arranged in the circumferential direction. The respective numbers of the concave portions 5e and the convex portions 5d are ten in the present embodiment. The concave portions 5e correspond to the magnetic poles of the resin magnet section 5 and are located between the magnetic poles of the resin magnetic section 5.

A plurality of the concave portions 5h are formed in the end face 5b of the resin magnet section 5 to be spaced substantially evenly in the circumferential direction. Each concave portion 5h is a gate port remaining as a gate processing mark created when the thermoplastic resin 3 is injected, and has an elliptical shape having a predetermined depth in the axial direction. Also, the respective concave portions 5h are located at positions corresponding to the concave portions 5e in the outer circumference of the resin magnet section 5, that is, between the magnetic poles of the resin magnet section 5. Because the rotor 10 has ten poles in the present embodiment, the number of the concave portions 5h is also ten.

By providing the gate ports (the concave portions 5h), the number of which corresponds to the number of the magnetic poles, as in the illustrated example, an injected state of the thermoplastic resin 3 when injection is performed is made uniform with respect to the magnetic poles and a state of alignment can also be made uniform, so that the quality of the resin magnet section 5 can be improved. Further, by providing the gate ports between the magnetic poles, the accuracy of alignment of the thermoplastic resin 3 containing ferrite can be improved, thereby improving the quality.

In FIG. 4, a hollow portion of the resin magnet section 5 (an inner diameter portion of the resin magnet section 5) is tapered from the end face 5b of the resin magnet section 5 to an approximately central position in the axial direction (a portion of the mold-matching face mark 51). This tapered portion (a tapered portion 5k) is formed in such a manner that an inner diameter of the hollow portion of the resin magnet section 5 gradually decreases as proceeding from the end face 5b of the resin magnet section 5 to the mold-matching face mark 51.

Further, the hollow portion of the resin magnet section 5 includes a straight portion 5j having a constant diameter from the mold-matching face mark 51 to the end face 5a. The straight portion 5j is formed by a movable side of the mold. Due to formation of the straight portion 5j, when the mold is opened, the resin magnet section 5 adheres to the movable side of the mold and a fixed side of the mold is smoothly separated from the resin magnet section 5, so that the quality in manufacturing can be improved. Note that a plurality of projections 5i are formed in the hollow portion of the resin magnet section 5 in the illustrated example. The projections 5i function as rotation stoppers when the resin magnet section 5 is molded integrally with the rotation shaft 6.

Resin injection marks 5f are resin injection portions remaining on a donut-like runner 21 formed at an end face of the core portion (the lower portion) of the mold for molding the resin magnet section 5 (see FIG. 3) created when the resin magnet section 5 is molded. The number of the resin injection marks 5f is a half of the number of the magnetic poles (five in a case where the number of the magnetic poles is ten), for example. These resin injection marks 5f are provided at an approximately equal pitch in the circumferential direction. Further, each resin injection mark 5f is provided at an approximately intermediate position between two rib-like runners 20.

FIG. 3 illustrates a runner 22 formed by the rib-like runners 20 and the donut-like runner 21. "Runner" is a portion that does not form the resin magnet section 5, and specifically refers to the donut-like runner 21, the rib-like runners 20, and another runner that is not illustrated (an axial direction runner described later).

A plurality of rib-like runners 20 are formed in an outer circumference of the donut-like runner 21, which radially extend from the outer circumference of the donut-like runner 21 outward in the radial direction. In the example of FIG. 3, ten rib-like runners 20 are formed the number of which corresponds to the number of the magnetic poles of the resin magnet section 5. The position of each rib-like runner 20 in the axial direction is approximately the same as the position of the donut-like runner 21 in the axial direction.

As already described, each resin injection mark 5f is provided at an approximately intermediate position between two rib-like runners 20. The donut-like runner 21 and the rib-like runners 20 are formed by the upper portion of the mold. Therefore, by employing a tapered shape in which the donut-like runner 21 and the rib-like runners 20 become smaller from the end face of the core portion (the lower portion) outward in the axial direction, it is possible to reduce adhering of the donut-like runner 21 and the rib-like runners 20 to the upper portion of the mold when the mold is opened.

Further, the donut-like runner 21 is engraved straight to be concave at a predetermined depth (in the axial direction) from the end face of the core portion (the lower portion). This concave portion functions as resistance to adhering of the donut-like runner 21 to the upper portion of the mold when the donut-like runner 21 is separated from the mold. Therefore, the lower portion is smoothly separated from the donut-like runner 21.

The rib-like runners 20 radially extending from the donut-like runner 21 extend on the axial direction end face of the core portion (the lower portion) of the mold for molding the resin magnet section 5, and then reaches the inner diameter side of the resin magnet section 5.

A resin magnet injected to the resin injection marks 5f of the donut-like runner 21 flows in the axial direction through the runner (not illustrated) until it reaches the resin injection marks 5f. Subsequently, the resin magnet changes its flowing direction by 90° at the resin injection marks 5f. That is, the resin magnet is divided into two streams flowing in directions perpendicular to the axial direction. Thereafter, the resin magnet in each of the two streams enters rib-like runners 20 that are closest to the resin injection marks 5f and further changes its flowing direction by 90° to flow into the resin magnet section 5.

By reducing the number of the resin injection marks 5f to a half of the number of the magnetic poles, it is possible to reduce the ratio of a runner amount to the resin magnet section 5, as compared with a case of providing the same number of resin injection portions of the resin magnet section 5 as the number of the magnetic poles. The runner amount is a total amount of the donut-like runner 21, the rib-like runners 20, and the axial direction runner (not illustrated). According to the present embodiment, the runner amount can be reduced by about 30%, as compared with the case of providing the same number of the resin injection portions of the resin magnet section 5 as the number of the magnetic poles. Further, because of reduction of the runner amount, the reuse ratio when the runner 22 that does not constitute a product is reused is reduced. Therefore, lowering of physical properties (mainly, a mechanical strength) of the resin magnet section 5 can be suppressed, thereby improving the product quality. Furthermore, although the number of the resin injection portions is a half of the number of the magnetic poles, the number of the rib-like runners 20 is the same as the number of the magnetic poles. Therefore, a degree of injection of the resin magnet section 5 is the same with respect to the respective magnetic poles, the state of alignment is also made uniform, and the quality in manufacturing can be improved.

The donut-like runner 21 and the rib-like runners 20 are removed after completion of molding of the resin magnet section 5 (see FIG. 5). In the rib-like runner 20, a portion from the donut-like runner 21 to an inner circumferential portion 5n of the resin magnet section 5 is removed. Therefore, a part of the rib-like runner 20 remains in the inner circumferential portion 5n of the resin magnet section 5, as in the illustrated example. By removing the rib-like runner 20 in such a manner that a part thereof remains, a removal mark 5m remains in the inner circumferential portion 5n of the resin magnet section 5. This removal mark 5m can also be used as a rotation stopper when the resin magnet section 5 is molded integrally with the rotation shaft 6.

Further, the resin magnet section 5 according to the present embodiment includes a magnetic section 1 for position detection. The magnetic section 1 is formed on the end face 5a of the resin magnet section 5 by the resin magnet injected from the inner diameter side of the resin magnet section 5 to the end face 5a of the resin magnet section 5, that is, the resin magnet injected via the runner 22. The runner 22 is removed after the resin magnet section 5 is formed, so that the magnetic section 1 remains on the end face 5a of the resin magnet section 5 (see FIG. 5). By providing the magnetic section 1, it is possible to detect a change of magnetic fluxes of the magnetic section by a position detection element 11 (see FIG. 7). Therefore, the position of the rotor 10 can be detected without using a magnet for position detection. Although the magnetic section 1 in the illustrated example is annular, its shape is not limited thereto.

In addition, because the rib-like runners 20 are connected with the magnetic section 1, the accuracy of alignment of the magnetic section 1 is improved, and the accuracy of detecting the position of the rotor 10 is improved.

Further, the magnetic section 1 is formed on the side of injection ports from which the resin magnet is injected (on the side of the rib-like runner 20). This configuration improves the accuracy of alignment of the magnetic section 1, so that the accuracy of detecting the position of the rotor 10 can be further improved and the quality of an electric motor can also be improved.

Furthermore, because the injection ports for the resin magnet (the rib-like runners 20) are provided between the magnetic poles in the present embodiment, the accuracy of alignment of the magnetic section 1 is improved, and the accuracy of detecting the position of the rotor 10 can be still further improved.

In addition, because the number of the injection ports for the resin magnet (the rib-like runners 20) is the same as the number of the magnetic poles of the resin magnet section 5 in the present embodiment, an injected state of the resin magnet when injection is performed is made uniform with respect to the magnetic poles and an alignment state can also be made uniform, as compared with a case where the number of the injection ports is less than the number of the magnetic poles of the resin magnet section 5. Therefore, the quality of the magnetic section 1 can be improved.

Although a ring-shaped runner (the donut-like runner 21) is used in the present embodiment, its shape is not limited to a ring shape, as long as the rib-like runners 20 and the axial direction runner can be connected to each other.

Further, the number of the injection ports for the resin magnet (the rib-like runners 20) is the same as the number of the magnetic poles of the resin magnet section 5 in the present embodiment. However, the number of the injection ports is not limited thereto, but may be less than the number of the magnetic poles of the resin magnet section 5. In the latter configuration, the position of the rotor 10 can be detected without using a magnet for position detection, and the runner amount is reduced, thereby reducing the cost of the rotor 10. Further, although the injection ports are provided between the magnetic poles in the present embodiment, the positions of the injection ports are not limited thereto. Also in the latter configuration, it is possible to achieve an effect that the position of the rotor 10 can be detected without using a magnet for position detection.

Next, a configuration example of the molded electric motor 40 including the rotor 10 therein is described. The molded electric motor 40 illustrated in FIG. 7 is configured to include the rotor 10, a molded stator 52, a sensor substrate 55, a bracket 43, and a pair of bearings 42 as main components. The molded stator 52 is obtained by mold-forming the stator 44, the sensor substrate 55, and the like by using thermosetting resin such as BMC (bulk molding compound).

The stator 44 is configured to include a stator iron core 48, an insulation section 47 applied to teeth of the stator iron core 48, and a coil 49 obtained by winding a magnet wire around the insulation section 47 as main components.

The stator iron core 48 is obtained by stacking a plurality of members punched into strips from an electromagnetic steel plate by caulking, welding, or bonding, for example. The insulation section 47 is obtained by molding thermoplastic resin, such as PBT (polybutylene terephthalate), integrally with the teeth of the stator iron core 48 or assembling the thermoplastic resin to the stator iron core 48.

An end portion of the magnet wire is wound around a hook portion of a terminal and is joined thereto by fusing, soldering, or the like. Thereafter, the core in the form of a strip is bent to a predetermined direction and butted portions are welded, so that a stator winding is formed. Note that in FIG. 7, one of axial direction end faces of the stator iron core 48 on the side of the position detection element 11 is called a wire-connection side and the opposite side is called a counter-connection side.

A wall (an outer wall) that prevents the coil 49 on an outer diameter side on the wire-connection side from falling to an outer diameter side of the stator 44 is provided with pins for fixing a lead wiring component at a plurality of locations. Further, a wall (an inner wall) that prevents the coil 49 on an inner diameter side on the counter-connection side from falling to an inner diameter side is provided with a projection. When the stator 44 is mold-formed, the stator 44 is set in a mold core-metal portion and is butted to and stopped by this projection in the axial direction.

An end of an axial direction end portion of the outer wall is formed to be higher than a maximum height of the coil 49 in the axial direction. It is desirable that the projection of the inner wall is as high as the end of the axial direction end portion of the outer wall. The coil 49 is formed in such a manner that its height in the axial direction becomes gradually lower as the coil 49 proceeds from the outer wall to the inner wall. Therefore, in a case where the height of the projection of the inner wall is made the same as the height of the outer wall, a distance from the projection of the inner wall to the coil 49 is sufficiently secured. Accordingly, when the stator 44 is placed in the mold core-metal portion with the counter-connection side of the stator iron core 48 facing down, the stator iron core 48 can be stably placed without causing the coil 49 to come into contact with the mold core-metal portion. Consequently, both the productivity and the quality are improved.

A power-source lead 53 that supplies power to the coil 49 is wired to the terminal to which the end of the magnet wire is joined, and is joined to the terminal by spot welding, soldering, and the like with a coating of the power-source lead 53 removed. An electronic component such as a hall IC, the position detection element 11 for the rotor 10, and the like are mounted on the sensor substrate 55. A sensor lead 54 is connected to the sensor substrate 55. A board-in connector 56 is connected to the sensor lead 54, and a terminal of the board-in connector 56 is electrically joined to the electronic component by soldering.

A lead wiring component is used for wiring of the power-source lead 53 and the sensor lead 54. The lead wiring component is formed of the thermoplastic resin 3 such as PBT to be substantially circular. A lead lead-out component 57 is assembled to an outer circumference of the lead wiring component and protrudes from an outer circumferential surface of the molded stator 52 to the outside.

Wire-connection components such as the lead wiring component and the sensor substrate 55 are assembled to the stator 44. Thereafter, these components are subjected to mold-forming using thermosetting resin to obtain the molded stator 52. Further, the rotor 10 with the bearings 42 attached thereto is inserted into the molded stator 52, and the bracket 43 and the like are assembled to obtain the molded electric motor 40. Because the molded electric motor 40 configured in this manner uses the rotor 10 of FIG. 1, the quality is higher and the cost can be reduced as compared with a conventional molded electric motor.

Figure 8:
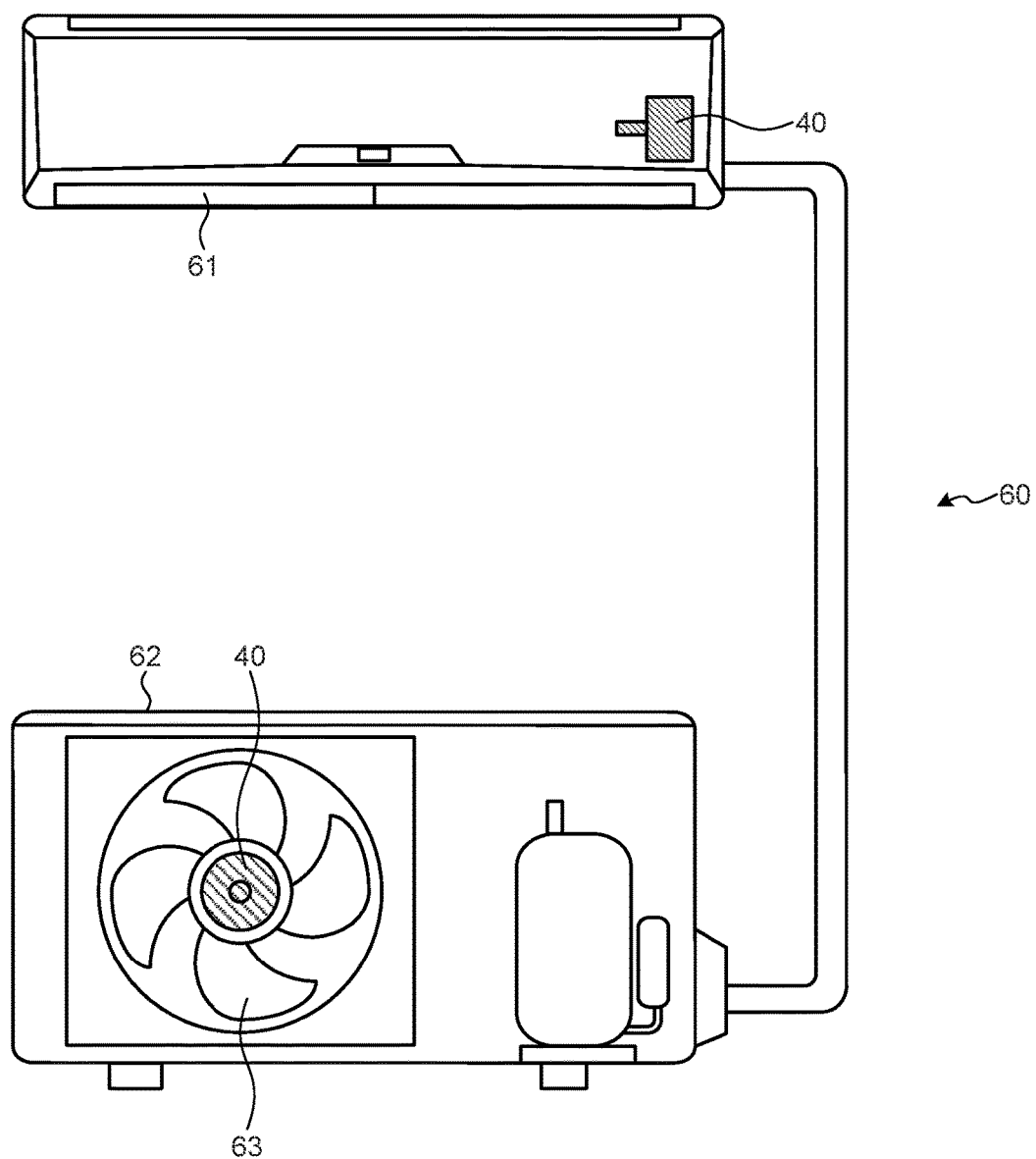
FIG. 8 is a diagram illustrating a configuration of an air conditioner according to the embodiment of the present invention.

FIG. 8 is a diagram illustrating a configuration of an air conditioner according to the embodiment of the present invention. An air conditioner 60 includes an indoor unit 61 and an outdoor unit 62 connected to the indoor unit 61. The outdoor unit 62 includes a blower 63. The indoor unit 61 also includes a blower (not illustrated).

The molded electric motor 40 of FIG. 7 is used as an electric motor for the blower in the indoor unit 61 and the outdoor unit 62. Because the air conditioner 60 configured in this manner uses the rotor 10 of FIG. 1, the quality is higher and the cost can be reduced as compared with the conventional air conditioner.

The configuration described in the above embodiment is an example of the configurations of the present invention and it goes without saying that the configuration can be combined with other well-known techniques and can be modified by omitting a part thereof or the like without departing from the scope of the present invention.

INDUSTRIAL APPLICABILITY

As described above, the present invention can be applied to a rotor of an electric motor, a molded electric motor, and an air conditioner, and is particularly useful as an invention that can achieve cost reduction while ensuring the accuracy of detecting the position of the rotor.

The invention claimed is:

1. A rotor of an electric motor configured by combining a annular magnet section molded of thermoplastic resin containing ferrite and a rotating shaft penetrating through the magnet section in an axial direction of the annular magnet section, the rotor comprising a magnetic section for position detection formed of a resin magnet injected to an axial direction end face of the annular magnet section and integrally formed of the resin magnet on the axial direction end face.

2. The rotor of the electric motor according to claim 1, wherein injection ports for injecting the resin magnet are provided inside the annular magnet section.

3. The rotor of the electric motor according to claim 1, wherein the injection ports for injecting the resin magnet are provided on one axial direction end face side of the annular magnet section on which the magnetic section is integrally formed.

4. The rotor of the electric motor according to claim 1, wherein the injection port for injecting the resin magnet is provided between magnetic poles of the annular magnet section.

5. The rotor of the electric motor according to claim 1, wherein number of the injection ports for injecting the resin magnet provided is same as number of the magnetic poles of the resin magnet section.

6. A molded electric motor using the rotor of the electric motor according to claim 1.

7. An air conditioner having the molded electric motor according to claim 6 mounted on a blower.

8. The rotor of the electric motor according to claim 1, further comprising a thermoplastic resin provided between the magnetic section and the rotating shaft, where
the magnetic section includes an inner-circumference-side resin section, and
the thermoplastic resin includes:
a cylindrical resin section; and
a plurality of ribs radially extending from the cylindrical resin section to the inner-circumference-side resin section.

9. The rotor of the electric motor according to claim 1, wherein
the thermoplastic resin includes a plurality of gate convex portions extending from the cylindrical resin section forward to an outer radial direction, each of which are separated from the cylindrical resin section.

* * * * *